(12) United States Patent
Zimmerman et al.

(10) Patent No.: US 10,108,010 B2
(45) Date of Patent: Oct. 23, 2018

(54) SYSTEM FOR AND METHOD OF INTEGRATING HEAD UP DISPLAYS AND HEAD DOWN DISPLAYS

(71) Applicants: Kenneth A. Zimmerman, Sherwood, OR (US); David I. Han, Lake Oswego, OR (US); Robert D. Brown, Lake Oswego, OR (US); Christopher A. Keith, Wilsonville, OR (US)

(72) Inventors: Kenneth A. Zimmerman, Sherwood, OR (US); David I. Han, Lake Oswego, OR (US); Robert D. Brown, Lake Oswego, OR (US); Christopher A. Keith, Wilsonville, OR (US)

(73) Assignee: ROCKWELL COLLINS, INC., Cedar Rapids, IA (US)

(*) Notice: Subject to any disclaimer, the term of this patent is extended or adjusted under 35 U.S.C. 154(b) by 154 days.

(21) Appl. No.: 14/754,368

(22) Filed: Jun. 29, 2015

(65) Prior Publication Data

US 2016/0377862 A1    Dec. 29, 2016

(51) Int. Cl.
| | |
|---|---|
| *G02B 27/01* | (2006.01) |
| *G02B 5/18* | (2006.01) |
| *F21V 8/00* | (2006.01) |
| *B64D 43/00* | (2006.01) |

(52) U.S. Cl.
CPC ......... *G02B 27/0101* (2013.01); *B64D 43/00* (2013.01); *G02B 6/0011* (2013.01); *G02B 5/1842* (2013.01); *G02B 2027/014* (2013.01); *G02B 2027/0141* (2013.01); *G02B 2027/0165* (2013.01)

(58) Field of Classification Search
CPC ...... G02B 2027/014; G02B 2027/0141; G02B 2027/015; G02B 2027/0152; G02B 2027/013; G02B 2027/0105; G02B 2027/0165; G02B 5/1842; G02B 27/0101; G02B 27/01; G02B 6/0011; B64D 43/00
See application file for complete search history.

(56) References Cited

U.S. PATENT DOCUMENTS

| | | |
|---|---|---|
| 2,141,884 A | 12/1938 | Sonnefeld |
| 3,620,601 A | 11/1971 | Waghorn |
| 3,851,303 A | 11/1974 | Muller |

(Continued)

FOREIGN PATENT DOCUMENTS

| | | |
|---|---|---|
| CN | 200944140 Y | 9/2007 |
| CN | 101881936 A | 11/2010 |

(Continued)

OTHER PUBLICATIONS

U.S. Appl. No. 14/225,062, filed Mar. 25, 2014, Carlo L. Tiana et al.

(Continued)

*Primary Examiner* — Marin Pichler
(74) *Attorney, Agent, or Firm* — Donna P. Suchy; Daniel Barbieri

(57) ABSTRACT

A method or system can be used with an aircraft or other vehicle. The system can include or the method can use a waveguide disposed above and below a top surface of a glare shield. The waveguide can be part of a head up display (HUD). The waveguide can be disposed to cover at least part of the head down display to provide an integrated display.

20 Claims, 6 Drawing Sheets

(56) References Cited

U.S. PATENT DOCUMENTS

| | | |
|---|---|---|
| 3,885,095 A | 5/1975 | Wolfson et al. |
| 3,940,204 A | 2/1976 | Withrington |
| 4,082,432 A | 4/1978 | Kirschner |
| 4,099,841 A | 7/1978 | Ellis |
| 4,178,074 A | 12/1979 | Heller |
| 4,218,111 A | 8/1980 | Withrington et al. |
| 4,232,943 A | 11/1980 | Rogers |
| 4,309,070 A | 1/1982 | St. Leger Searle |
| 4,647,967 A | 3/1987 | Kirschner et al. |
| 4,711,512 A | 12/1987 | Upatnieks |
| 4,714,320 A | 12/1987 | Banbury |
| 4,743,083 A | 5/1988 | Schimpe |
| 4,749,256 A | 6/1988 | Bell et al. |
| 4,775,218 A | 10/1988 | Wood et al. |
| 4,799,765 A * | 1/1989 | Ferrer .............. G02B 27/0103 359/13 |
| 4,854,688 A | 8/1989 | Hayford et al. |
| 4,928,301 A | 5/1990 | Smoot |
| 4,946,245 A | 8/1990 | Chamberlin et al. |
| 5,007,711 A | 4/1991 | Wood et al. |
| 5,035,734 A | 7/1991 | Honkanen et al. |
| 5,076,664 A | 12/1991 | Migozzi |
| 5,079,416 A | 1/1992 | Filipovich |
| 5,117,285 A | 5/1992 | Nelson et al. |
| 5,124,821 A | 6/1992 | Antier et al. |
| 5,148,302 A | 9/1992 | Nagano et al. |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,183,545 A | 2/1993 | Branca et al. |
| 5,187,597 A | 2/1993 | Kato et al. |
| 5,210,624 A | 5/1993 | Matsumoto et al. |
| 5,218,360 A | 6/1993 | Goetz et al. |
| 5,243,413 A | 9/1993 | Gitlin et al. |
| 5,289,315 A | 2/1994 | Makita et al. |
| 5,295,208 A | 3/1994 | Caulfield et al. |
| 5,303,085 A | 4/1994 | Rallison |
| 5,317,405 A | 5/1994 | Kuriki et al. |
| 5,341,230 A | 8/1994 | Smith |
| 5,351,151 A | 9/1994 | Levy |
| 5,359,362 A | 10/1994 | Lewis et al. |
| 5,363,220 A | 11/1994 | Kuwayama et al. |
| 5,369,511 A | 11/1994 | Amos |
| 5,400,069 A | 3/1995 | Braun et al. |
| 5,408,346 A | 4/1995 | Trissel et al. |
| 5,418,584 A | 5/1995 | Larson |
| 5,438,357 A | 8/1995 | McNelley |
| 5,455,693 A | 10/1995 | Wreede et al. |
| 5,471,326 A | 11/1995 | Hall et al. |
| 5,473,222 A | 12/1995 | Thoeny et al. |
| 5,496,621 A | 3/1996 | Makita et al. |
| 5,500,671 A | 3/1996 | Andersson et al. |
| 5,510,913 A | 4/1996 | Hashimoto et al. |
| 5,515,184 A | 5/1996 | Caulfield et al. |
| 5,524,272 A | 6/1996 | Podowski et al. |
| 5,532,736 A | 7/1996 | Kuriki et al. |
| 5,537,232 A | 7/1996 | Biles |
| 5,572,248 A | 11/1996 | Allen et al. |
| 5,579,026 A | 11/1996 | Tabata |
| 5,583,795 A | 12/1996 | Smyth |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,907 A | 9/1997 | Veligdan |
| 5,682,255 A | 10/1997 | Friesem et al. |
| 5,694,230 A | 12/1997 | Welch |
| 5,701,132 A | 12/1997 | Kollin et al. |
| 5,706,108 A | 1/1998 | Ando et al. |
| 5,707,925 A | 1/1998 | Akada et al. |
| 5,724,189 A | 3/1998 | Ferrante |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,742,262 A | 4/1998 | Tabata et al. |
| 5,751,452 A | 5/1998 | Tanaka et al. |
| 5,760,931 A | 6/1998 | Saburi et al. |
| 5,764,414 A | 6/1998 | King et al. |
| 5,790,288 A | 8/1998 | Jager et al. |
| 5,812,608 A | 9/1998 | Valimaki et al. |
| 5,822,127 A | 10/1998 | Chen et al. |
| 5,841,507 A | 11/1998 | Barnes |
| 5,856,842 A | 1/1999 | Tedesco |
| 5,868,951 A | 2/1999 | Schuck et al. |
| 5,892,598 A | 4/1999 | Asakawa et al. |
| 5,898,511 A | 4/1999 | Mizutani et al. |
| 5,903,395 A | 5/1999 | Rallison et al. |
| 5,907,416 A | 5/1999 | Hegg et al. |
| 5,907,436 A | 5/1999 | Perry et al. |
| 5,917,459 A | 6/1999 | Son et al. |
| 5,926,147 A | 7/1999 | Sehm et al. |
| 5,929,946 A | 7/1999 | Sharp et al. |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,966,223 A | 10/1999 | Friesem et al. |
| 5,985,422 A | 11/1999 | Krauter |
| 5,991,087 A | 11/1999 | Rallison |
| 5,999,314 A | 12/1999 | Asakura et al. |
| 6,042,947 A | 3/2000 | Asakura et al. |
| 6,043,585 A | 3/2000 | Plessky et al. |
| 6,075,626 A | 6/2000 | Mizutani et al. |
| 6,078,427 A | 6/2000 | Fontaine et al. |
| 6,115,152 A | 9/2000 | Popovich et al. |
| 6,127,066 A | 10/2000 | Ueda et al. |
| 6,137,630 A | 10/2000 | Tsou et al. |
| 6,169,613 B1 | 1/2001 | Amitai et al. |
| 6,176,837 B1 | 1/2001 | Foxlin |
| 6,195,206 B1 | 2/2001 | Yona et al. |
| 6,222,675 B1 | 4/2001 | Mall et al. |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,285,813 B1 | 9/2001 | Schultz et al. |
| 6,317,083 B1 | 11/2001 | Johnson et al. |
| 6,317,227 B1 | 11/2001 | Mizutani et al. |
| 6,321,069 B1 | 11/2001 | Piirainen |
| 6,327,089 B1 | 12/2001 | Hosaki et al. |
| 6,333,819 B1 | 12/2001 | Svedenkrans |
| 6,340,540 B1 | 1/2002 | Ueda et al. |
| 6,351,333 B2 | 2/2002 | Araki et al. |
| 6,356,172 B1 | 3/2002 | Koivisto et al. |
| 6,359,730 B2 | 3/2002 | Tervonen |
| 6,359,737 B1 | 3/2002 | Stringfellow |
| 6,366,378 B1 | 4/2002 | Tervonen et al. |
| 6,392,812 B1 | 5/2002 | Howard |
| 6,409,687 B1 | 6/2002 | Foxlin |
| 6,470,132 B1 | 10/2002 | Nousiainen et al. |
| 6,486,997 B1 | 11/2002 | Bruzzone et al. |
| 6,504,518 B1 | 1/2003 | Kuwayama et al. |
| 6,524,771 B2 | 2/2003 | Maeda et al. |
| 6,545,778 B2 | 4/2003 | Ono et al. |
| 6,550,949 B1 | 4/2003 | Bauer et al. |
| 6,557,413 B2 | 5/2003 | Nieminen et al. |
| 6,563,648 B2 | 5/2003 | Gleckman et al. |
| 6,580,529 B1 | 6/2003 | Amitai et al. |
| 6,583,873 B1 | 6/2003 | Goncharov et al. |
| 6,587,619 B1 | 7/2003 | Kinoshita |
| 6,598,987 B1 | 7/2003 | Parikka |
| 6,608,720 B1 | 8/2003 | Freeman |

(56) References Cited

U.S. PATENT DOCUMENTS

| | | |
|---|---|---|
| 6,611,253 B1 | 8/2003 | Cohen |
| 6,646,810 B2 | 11/2003 | Harter et al. |
| 6,661,578 B2 | 12/2003 | Hedrick |
| 6,674,578 B2 | 1/2004 | Sugiyama et al. |
| 6,686,815 B1 | 2/2004 | Mirshekarl-Syahkal et al. |
| 6,690,516 B2 | 2/2004 | Aritake et al. |
| 6,721,096 B2 | 4/2004 | Bruzzone et al. |
| 6,741,189 B1 | 5/2004 | Gibbons, II et al. |
| 6,744,478 B1 | 6/2004 | Asakura et al. |
| 6,748,342 B1 | 6/2004 | Dickhaus |
| 6,750,941 B2 | 6/2004 | Satoh et al. |
| 6,750,995 B2 | 6/2004 | Dickson |
| 6,757,105 B2 | 6/2004 | Niv et al. |
| 6,771,403 B1 | 8/2004 | Endo et al. |
| 6,776,339 B2 | 8/2004 | Piikivi |
| 6,781,701 B1 | 8/2004 | Sweetser et al. |
| 6,805,490 B2 | 10/2004 | Levola |
| 6,825,987 B2 | 11/2004 | Repetto et al. |
| 6,829,095 B2 | 12/2004 | Amitai |
| 6,833,955 B2 | 12/2004 | Niv |
| 6,836,369 B2 | 12/2004 | Fujikawa et al. |
| 6,844,212 B2 | 1/2005 | Bond et al. |
| 6,844,980 B2 | 1/2005 | He et al. |
| 6,847,274 B2 | 1/2005 | Salmela et al. |
| 6,847,488 B2 | 1/2005 | Travis |
| 6,853,491 B1 | 2/2005 | Ruhle et al. |
| 6,864,861 B2 | 3/2005 | Schehrer et al. |
| 6,864,927 B1 | 3/2005 | Cathey |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,922,267 B2 | 7/2005 | Endo et al. |
| 6,926,429 B2 | 8/2005 | Barlow et al. |
| 6,940,361 B1 | 9/2005 | Jokio et al. |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,958,662 B1 | 10/2005 | Salmela et al. |
| 6,987,908 B2 | 1/2006 | Bond et al. |
| 7,003,187 B2 | 2/2006 | Frick et al. |
| 7,018,744 B2 | 3/2006 | Otaki et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,053,735 B2 | 5/2006 | Salmela et al. |
| 7,058,434 B2 | 6/2006 | Wang et al. |
| 7,095,562 B1 | 8/2006 | Peng et al. |
| 7,101,048 B2 | 9/2006 | Travis |
| 7,110,184 B1 | 9/2006 | Yona et al. |
| 7,123,418 B2 | 10/2006 | Weber et al. |
| 7,126,418 B2 | 10/2006 | Hunton et al. |
| 7,126,583 B1 | 10/2006 | Breed |
| 7,132,200 B1 | 11/2006 | Ueda et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,181,105 B2 | 2/2007 | Teramura et al. |
| 7,181,108 B2 | 2/2007 | Levola |
| 7,184,615 B2 | 2/2007 | Levola |
| 7,190,849 B2 | 3/2007 | Katase |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,230,767 B2 | 6/2007 | Walck et al. |
| 7,242,527 B2 | 7/2007 | Spitzer et al. |
| 7,248,128 B2 | 7/2007 | Mattila et al. |
| 7,259,906 B1 | 8/2007 | Islam |
| 7,268,946 B2 | 9/2007 | Wang |
| 7,285,903 B2 | 10/2007 | Cull et al. |
| 7,286,272 B2 | 10/2007 | Mukawa |
| 7,289,069 B2 | 10/2007 | Ranta |
| 7,299,983 B2 | 11/2007 | Piikivi |
| 7,313,291 B2 | 12/2007 | Okhotnikov et al. |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,375,870 B2 | 5/2008 | Schorpp |
| 7,391,573 B2 | 6/2008 | Amitai |
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,415,173 B2 | 8/2008 | Kassamakov et al. |
| 7,418,170 B2 | 8/2008 | Mukawa et al. |
| 7,433,116 B1 | 10/2008 | Islam |
| 7,436,568 B1 | 10/2008 | Kuykendall, Jr. |
| 7,454,103 B2 | 11/2008 | Parriaux |
| 7,457,040 B2 | 11/2008 | Amitai |
| 7,466,994 B2 | 12/2008 | Pihlaja et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,500,104 B2 | 3/2009 | Goland |
| 7,528,385 B2 | 5/2009 | Volodin et al. |
| 7,545,429 B2 | 6/2009 | Travis |
| 7,550,234 B2 | 6/2009 | Otaki et al. |
| 7,567,372 B2 | 7/2009 | Schorpp |
| 7,570,429 B2 | 8/2009 | Malian et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,588,863 B2 | 9/2009 | Takizawa et al. |
| 7,589,900 B1 | 9/2009 | Powell |
| 7,589,901 B2 | 9/2009 | Dejong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,616,270 B2 | 11/2009 | Hirabayashi et al. |
| 7,618,750 B2 | 11/2009 | Ueda et al. |
| 7,629,086 B2 | 12/2009 | Otaki et al. |
| 7,639,911 B2 | 12/2009 | Lee et al. |
| 7,643,214 B2 | 1/2010 | Amitai |
| 7,656,585 B1 | 2/2010 | Powell et al. |
| 7,660,047 B1 | 2/2010 | Travis et al. |
| 7,672,055 B2 | 3/2010 | Amitai |
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,572 B1 | 6/2010 | Brown et al. |
| 7,747,113 B2 | 6/2010 | Mukawa et al. |
| 7,751,122 B2 | 7/2010 | Amitai |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,872,804 B2 | 1/2011 | Moon et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,944,428 B2 | 5/2011 | Travis |

(56) References Cited

U.S. PATENT DOCUMENTS

| | | |
|---|---|---|
| 7,969,644 B2 | 6/2011 | Tilleman et al. |
| 7,970,246 B2 | 6/2011 | Travis et al. |
| 7,976,208 B2 | 7/2011 | Travis |
| 7,999,982 B2 | 8/2011 | Endo et al. |
| 8,000,491 B2 | 8/2011 | Brodkin et al. |
| 8,004,765 B2 | 8/2011 | Amitai |
| 8,016,475 B2 | 9/2011 | Travis |
| 8,022,942 B2 | 9/2011 | Bathiche et al. |
| RE42,992 E | 12/2011 | David |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,107,023 B2 | 1/2012 | Simmonds et al. |
| 8,107,780 B2 | 1/2012 | Simmonds |
| 8,132,948 B2 | 3/2012 | Owen et al. |
| 8,132,976 B2 | 3/2012 | Odell et al. |
| 8,136,690 B2 | 3/2012 | Fang et al. |
| 8,137,981 B2 | 3/2012 | Andrew et al. |
| 8,149,086 B2 | 4/2012 | Klein et al. |
| 8,152,315 B2 | 4/2012 | Travis et al. |
| 8,155,489 B2 | 4/2012 | Saarikko et al. |
| 8,159,752 B2 | 4/2012 | Wertheim et al. |
| 8,160,409 B2 | 4/2012 | Large |
| 8,160,411 B2 | 4/2012 | Levola et al. |
| 8,186,874 B2 | 5/2012 | Sinbar et al. |
| 8,188,925 B2 | 5/2012 | Dejean |
| 8,189,263 B1 | 5/2012 | Wang et al. |
| 8,189,973 B2 | 5/2012 | Travis et al. |
| 8,199,803 B2 | 6/2012 | Hauske et al. |
| 8,213,065 B2 | 7/2012 | Mukawa |
| 8,233,204 B1 | 7/2012 | Robbins et al. |
| 8,253,914 B2 | 8/2012 | Kajiya et al. |
| 8,254,031 B2 | 8/2012 | Levola |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,314,819 B2 | 11/2012 | Kimmel et al. |
| 8,321,810 B2 | 11/2012 | Heintze |
| 8,335,040 B2 | 12/2012 | Mukawa et al. |
| 8,351,744 B2 | 1/2013 | Travis et al. |
| 8,354,806 B2 | 1/2013 | Travis et al. |
| 8,355,610 B2 | 1/2013 | Simmonds |
| 8,369,019 B2 | 2/2013 | Baker et al. |
| 8,384,694 B2 | 2/2013 | Powell et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,447,365 B1 | 5/2013 | Imanuel |
| 8,472,119 B1 | 6/2013 | Kelly |
| 8,477,261 B2 | 7/2013 | Travis et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,662 B2 | 7/2013 | Noui |
| 8,508,848 B2 | 8/2013 | Saarikko |
| 8,547,638 B2 | 10/2013 | Levola |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| 8,633,786 B2 | 1/2014 | Ermolov et al. |
| 8,639,072 B2 | 1/2014 | Popovich et al. |
| 8,643,691 B2 | 2/2014 | Rosenfeld et al. |
| 8,649,099 B2 | 2/2014 | Schultz et al. |
| 8,654,420 B2 | 2/2014 | Simmonds |
| 8,659,826 B1 | 2/2014 | Brown et al. |
| 8,670,029 B2 | 3/2014 | McEldowney |
| 8,693,087 B2 | 4/2014 | Nowatzyk et al. |
| 8,736,802 B2 | 5/2014 | Kajiya et al. |
| 8,736,963 B2 | 5/2014 | Robbins et al. |
| 8,749,886 B2 | 6/2014 | Gupta |
| 8,767,294 B2 | 7/2014 | Chen et al. |
| 8,810,600 B2 | 8/2014 | Bohn et al. |
| 8,814,691 B2 | 8/2014 | Haddick et al. |
| 8,830,584 B2 | 9/2014 | Saarikko et al. |
| 8,830,588 B1 | 9/2014 | Brown et al. |
| 8,913,324 B2 | 12/2014 | Schrader |
| 8,938,141 B2 | 1/2015 | Magnusson |
| 8,964,298 B2 | 2/2015 | Haddick et al. |
| 9,097,890 B2 | 8/2015 | Miller et al. |
| 9,244,280 B1 | 1/2016 | Tiana et al. |
| 9,456,744 B2 | 10/2016 | Popovich et al. |
| 9,523,852 B1 | 12/2016 | Brown et al. |
| 2002/0012064 A1 | 1/2002 | Yamaguchi |
| 2002/0021461 A1 | 2/2002 | Ono et al. |
| 2002/0131175 A1 | 9/2002 | Yagi et al. |
| 2003/0030912 A1 | 2/2003 | Gleckman |
| 2003/0039442 A1 | 2/2003 | Bond et al. |
| 2003/0063042 A1 | 4/2003 | Friesem et al. |
| 2003/0149346 A1 | 8/2003 | Arnone et al. |
| 2003/0228019 A1 | 12/2003 | Eichler et al. |
| 2004/0089842 A1 | 5/2004 | Sutherland et al. |
| 2004/0130797 A1 | 7/2004 | Leigh Travis |
| 2004/0188617 A1 | 9/2004 | Devitt et al. |
| 2004/0208446 A1 | 10/2004 | Bond et al. |
| 2004/0208466 A1 | 10/2004 | Mossberg et al. |
| 2005/0135747 A1 | 6/2005 | Greiner et al. |
| 2005/0136260 A1 | 6/2005 | Garcia |
| 2005/0259302 A9 | 11/2005 | Metz et al. |
| 2005/0269481 A1 | 12/2005 | David et al. |
| 2006/0093793 A1 | 5/2006 | Miyakawa et al. |
| 2006/0114564 A1 | 6/2006 | Sutherland et al. |
| 2006/0119916 A1 | 6/2006 | Sutherland et al. |
| 2006/0132914 A1 | 6/2006 | Weiss et al. |
| 2006/0215244 A1 | 9/2006 | Yosha et al. |
| 2006/0221448 A1 | 10/2006 | Nivon et al. |
| 2006/0228073 A1 | 10/2006 | Mukawa et al. |
| 2006/0279662 A1 | 12/2006 | Kapellner et al. |
| 2006/0291021 A1 | 12/2006 | Mukawa |
| 2007/0019152 A1 | 1/2007 | Caputo et al. |
| 2007/0019297 A1 | 1/2007 | Stewart et al. |
| 2007/0041684 A1 | 2/2007 | Popovich et al. |
| 2007/0045596 A1 | 3/2007 | King et al. |
| 2007/0089625 A1 | 4/2007 | Grinberg et al. |
| 2007/0133920 A1 | 6/2007 | Lee et al. |
| 2007/0133983 A1 | 6/2007 | Traff |
| 2007/0188837 A1 | 8/2007 | Shimizu et al. |
| 2007/0211164 A1 | 9/2007 | Olsen et al. |
| 2008/0043334 A1 | 2/2008 | Itzkovitch et al. |
| 2008/0106775 A1 | 5/2008 | Amitai et al. |
| 2008/0136923 A1 | 6/2008 | Inbar et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2008/0309586 A1 | 12/2008 | Vitale |
| 2009/0017424 A1 | 1/2009 | Yoeli et al. |
| 2009/0019222 A1 | 1/2009 | Verma et al. |
| 2009/0052046 A1 | 2/2009 | Amitai |
| 2009/0052047 A1 | 2/2009 | Amitai |
| 2009/0067774 A1 | 3/2009 | Magnusson |
| 2009/0097122 A1 | 4/2009 | Niv |
| 2009/0097127 A1 | 4/2009 | Amitai |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128902 A1 | 5/2009 | Niv et al. |
| 2009/0128911 A1 | 5/2009 | Itzkovitch et al. |
| 2009/0153437 A1 | 6/2009 | Aharoni |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0303599 A1 | 12/2009 | Levola |
| 2009/0316246 A1 | 12/2009 | Asai et al. |
| 2010/0039796 A1 | 2/2010 | Mukawa |
| 2010/0060551 A1 | 3/2010 | Sugiyama et al. |

(56) References Cited

U.S. PATENT DOCUMENTS

| | | |
|---|---|---|
| 2010/0060990 A1 | 3/2010 | Wertheim et al. |
| 2010/0079865 A1 | 4/2010 | Saarikko et al. |
| 2010/0092124 A1 | 4/2010 | Magnusson et al. |
| 2010/0096562 A1 | 4/2010 | Klunder et al. |
| 2010/0103078 A1 | 4/2010 | Mukawa et al. |
| 2010/0136319 A1 | 6/2010 | Imai et al. |
| 2010/0141555 A1 | 6/2010 | Rorberg et al. |
| 2010/0165465 A1 | 7/2010 | Levola |
| 2010/0171680 A1 | 7/2010 | Lapidot et al. |
| 2010/0177388 A1 | 7/2010 | Cohen et al. |
| 2010/0214659 A1 | 8/2010 | Levola |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0296163 A1 | 11/2010 | Saarikko |
| 2010/0315719 A1 | 12/2010 | Saarikko et al. |
| 2010/0321781 A1 | 12/2010 | Levola et al. |
| 2011/0013423 A1 | 1/2011 | Selbrede et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0038024 A1 | 2/2011 | Wang et al. |
| 2011/0050548 A1 | 3/2011 | Blumenfeld et al. |
| 2011/0096401 A1 | 4/2011 | Levola |
| 2011/0157707 A1 | 6/2011 | Tilleman et al. |
| 2011/0164221 A1 | 7/2011 | Tilleman et al. |
| 2011/0211239 A1 | 9/2011 | Mukawa et al. |
| 2011/0235179 A1 | 9/2011 | Simmonds |
| 2011/0235365 A1 | 9/2011 | McCollum |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2011/0310356 A1 | 12/2011 | Vallius |
| 2012/0007979 A1 | 1/2012 | Schneider et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0099203 A1 | 4/2012 | Boubis et al. |
| 2012/0105634 A1 | 5/2012 | Meidan et al. |
| 2012/0120493 A1 | 5/2012 | Simmonds et al. |
| 2012/0127577 A1 | 5/2012 | Desserouer |
| 2012/0224062 A1 | 9/2012 | Lacoste et al. |
| 2012/0235884 A1 | 9/2012 | Miller et al. |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0300311 A1 | 11/2012 | Simmonds et al. |
| 2012/0320460 A1 | 12/2012 | Levola |
| 2013/0069850 A1 | 3/2013 | Mukawa et al. |
| 2013/0088412 A1* | 4/2013 | Helot ............ G02B 27/01 345/3.1 |
| 2013/0093893 A1 | 4/2013 | Schofield |
| 2013/0101253 A1 | 4/2013 | Popovich et al. |
| 2013/0138275 A1 | 5/2013 | Nauman et al. |
| 2013/0141937 A1 | 6/2013 | Katsuta et al. |
| 2013/0170031 A1 | 7/2013 | Bohn et al. |
| 2013/0184904 A1 | 7/2013 | Gadzinski |
| 2013/0200710 A1 | 8/2013 | Robbins |
| 2013/0249895 A1 | 9/2013 | Westerinen et al. |
| 2013/0250207 A1 | 9/2013 | Bohn |
| 2013/0257848 A1 | 10/2013 | Westerinen et al. |
| 2013/0258701 A1 | 10/2013 | Westerinen et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2014/0043689 A1 | 2/2014 | Mason |
| 2014/0104665 A1 | 4/2014 | Popovich et al. |
| 2014/0104685 A1 | 4/2014 | Bohn et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0172296 A1 | 6/2014 | Shtukater |
| 2014/0176528 A1 | 6/2014 | Robbins |
| 2014/0204455 A1 | 7/2014 | Popovich et al. |
| 2014/0211322 A1 | 7/2014 | Bohn et al. |
| 2014/0218801 A1 | 8/2014 | Simmonds et al. |
| 2014/0300966 A1 | 10/2014 | Travers et al. |
| 2015/0010265 A1 | 1/2015 | Popovich et al. |
| 2015/0167868 A1 | 6/2015 | Boncha |
| 2015/0177688 A1 | 6/2015 | Popovich et al. |
| 2015/0277375 A1 | 10/2015 | Large et al. |
| 2015/0289762 A1 | 10/2015 | Popovich et al. |
| 2015/0316768 A1 | 11/2015 | Simmonds |
| 2016/0209657 A1 | 7/2016 | Popovich et al. |

FOREIGN PATENT DOCUMENTS

| | | |
|---|---|---|
| DE | 10 2006 003 785 | 7/2007 |
| EP | 0 822 441 | 2/1998 |
| EP | 2 110 701 | 10/2009 |
| EP | 2 225 592 | 9/2010 |
| EP | 2 381 290 | 10/2011 |
| EP | 2 733 517 | 5/2014 |
| FR | 2677463 | 12/1992 |
| GB | 2 115 178 A | 9/1983 |
| JP | 2004-157245 | 6/2004 |
| JP | 2006-350129 A | 12/2006 |
| JP | 2007-219106 A | 8/2007 |
| WO | WO-99/52002 | 10/1999 |
| WO | WO-03/081320 A1 | 10/2003 |
| WO | WO-2006/002870 | 1/2006 |
| WO | WO-2007/130130 A2 | 11/2007 |
| WO | WO-2007/130130 A3 | 11/2007 |
| WO | WO-2009/013597 A2 | 1/2009 |
| WO | WO-2009/077802 | 6/2009 |
| WO | WO-2010/067114 | 6/2010 |
| WO | WO-2010/067117 | 6/2010 |
| WO | WO-2010/125337 A2 | 11/2010 |
| WO | WO-2010/125337 A3 | 11/2010 |
| WO | WO-2011/012825 | 2/2011 |
| WO | WO-2011/051660 A1 | 5/2011 |
| WO | WO-2011/055109 A2 | 5/2011 |
| WO | WO-2011/107831 | 9/2011 |
| WO | WO-2013/027006 A1 | 2/2013 |
| WO | WO-2013/033274 A1 | 3/2013 |
| WO | WO-2013/163347 | 10/2013 |
| WO | WO-2014/091200 | 6/2014 |

OTHER PUBLICATIONS

Amendment and Reply for U.S. Appl. No. 12/571,262, dated Dec. 16, 2011, 7 pages.

Amitai, Y., et al. "Visor-display design based on planar holographic optics," Applied Optics, vol. 34, No. 8, Mar. 10, 1995, pp. 1352-1356.

Ayras, et al., "Exit pupil expander with a large field of view based on diffractive optics", Journal of the Society for Information Display, Aug. 17, 2009, pp. 659-664.

Cameron, A., The Application of Holograhpic Optical Waveguide Technology to Q-Sight Family of Helmet Mounted Displays, Proc. of SPIE, vol. 7326, 7326OH-1, 2009, 11 pages.

Caputo, R. et al., POLICRYPS Switchable Holographic Grating: A Promising Grating Electro-Optical Pixel for High Resolution Display Application; Journal of Display Technology, vol. 2, No. 1, Mar. 2006, pp. 38-51, 14 pages.

Crawford, "Switchable Bragg Gratings", Optics & Photonics News, Apr. 2003, pp. 54-59.

Extended European Search Report for EP Application No. 13192383, dated Apr. 2, 2014, 7 pages.

(56) References Cited

OTHER PUBLICATIONS

Final Office Action in U.S. Appl. No. 13/864,991, dated Apr. 2, 2015, 16 pages.
Final Office Action in U.S. Appl. No. 13/869,866 dated Oct. 3, 2014, 17 pages.
Final Office Action in U.S. Appl. No. 13/250,858 dated Feb. 4, 2015, 18 pages.
Final Office Action in U.S. Appl. No. 13/250,940 dated Oct. 17, 2014, 15 pages.
Final Office Action in U.S. Appl. No. 13/892,026 dated Apr. 3, 2015, 17 pages.
Final Office Action in U.S. Appl. No. 13/892,057 dated Mar. 5, 2015, 21 pages.
Final Office Action in U.S. Appl. No. 14/038,400 dated Aug. 10, 2015, 32 pages.
First office action received in Chinese patent application No. 201380001530.1, dated Jun. 30, 2015, 9 pages with English translation.
International Preliminary Report on Patentability for PCT Application No. PCT/US2013/038070, dated Oct. 28, 2014, 6 pages.
International Search Report and Written Opinion regarding PCT/US2013/038070, dated Aug. 14, 2013, 14 pages.
Irie, Masahiro, Photochromic diarylethenes for photonic devices, Pure and Applied Chemistry, 1996, pp. 1367-1371, vol. 68, No. 7, IUPAC.
Levola, et al., "Replicated slanted gratings with a high refractive index material for in and outcoupling of light" Optics Express, vol. 15, Issue 5, pp. 2067-2074 (2007).
Moffitt, "Head-Mounted Display Image Configurations", retrieved from the internet at http://www.kirkmoffitt.com/hmd_image_configurations.pdf on Dec. 19, 2014, dated May 2008, 25 pages.
Non-Final Office Action on U.S. Appl. No. 13/869,866 dated Jul. 22, 2015, 28 pages.
Non-Final Office Action on U.S. Appl. No. 13/892,026 dated Aug. 6, 2015, 22 pages.
Non-Final Office Action on U.S. Appl. No. 13/892,057 dated Jul. 30, 2015, 29 pages.
Non-Final Office Action on U.S. Appl. No. 13/250,858 dated Jun. 12, 2015, 20 pages.
Non-Final Office Action on U.S. Appl. No. 13/250,858 dated Sep. 15, 2014, 16 pages.
Non-Final Office Action on U.S. Appl. No. 13/250,940 dated Mar. 18, 2015, 17 pages.
Non-Final Office Action on U.S. Appl. No. 13/432,662 dated May 27, 2015, 15 pages.
Non-Final Office Action on U.S. Appl. No. 13/844,456 dated Apr. 1, 2015, 16 Pages.
Non-Final Office Action on U.S. Appl. No. 13/864,991 dated Oct. 22, 2014, 16 pages.
Non-Final Office Action on U.S. Appl. No. 13/869,866 dated May 28, 2014, 16 pages.
Non-Final Office Action on U.S. Appl. No. 14/038,400 dated Feb. 5, 2015, 18 pages.
Non-Final Office Action on U.S. Appl. No. 14/044,676 dated Apr. 9, 2015, 13 pages.
Non-Final Office Action on U.S. Appl. No. 14/109,551 dated Jul. 14, 2015, 32 pages.
Non-Final Office Action on U.S. Appl. No. 14/152,756, dated Aug. 25, 2015, 39 pages.
Non-Final Office Action on U.S. Appl. No. 14/168,173 dated Jun. 22, 2015, 14 pages.
Non-Final Office Action on U.S. Appl. No. 14/225,062 dated May 21, 2015, 11 pages.
Nordin, G., et al., "Diffraction properties of stratified volume holographic optical elements," Journal of the Optical Society of America A., vol. 9, No. 12, Dec. 1992, pp. 2206-2217, 12 pages.
Notice of Allowance for U.S. Appl. No. 12/700,557, dated Oct. 22, 2013, 9 pages.
Notice of Allowance on U.S. Appl. No. 13/250,970 dated Sep. 16, 2014, 7 pages.
Notice of Allowance on U.S. Appl. No. 13/251,087 dated Jul. 17, 2014, 8 pages.
Notice of Allowance on U.S. Appl. No. 13/355,360 dated Apr. 10, 2014, 7 pages.
Notice of Allowance on U.S. Appl. No. 14/038,400, dated Oct. 30, 2015, 9 pages.
Notice of Allowance on U.S. Appl. No. 14/225,062, dated Dec. 2, 2015, 10 pages.
Office Action for U.S. Appl. No. 12/571,262, dated Sep. 28, 2011, 5 pages.
Office Action for U.S. Appl. No. 12/700,557, dated Aug. 9, 2013, 12 pages.
Office Action for U.S. Appl. No. 12/700,557, dated Feb. 4, 2013, 11 pages.
Office Action for U.S. Appl. No. 13/250,621, dated May 21, 2013, 10 pages.
Office Action for U.S. Appl. No. 13/250,858 dated Feb. 19, 2014, 13 pages.
Office Action for U.S. Appl. No. 13/250,858, dated Oct. 28, 2013, 9 pages.
Office Action for U.S. Appl. No. 13/250,940, dated Aug. 28, 2013, 15 pages.
Office Action for U.S. Appl. No. 13/250,940, dated Mar. 12, 2013, 11 pages.
Office Action for U.S. Appl. No. 13/250,970, dated Jul. 30, 2013, 4 pages.
Office Action for U.S. Appl. No. 13/250,994, dated Sep. 16, 2013, 11 pages.
Office Action for U.S. Appl. No. 13/355,360, dated Sep. 12, 2013, 7 pages.
Office Action on U.S. Appl. No. 13/250,940 dated Mar. 25, 2014, 12 pages.
Office Action on U.S. Appl. No. 13/251,087 dated Mar. 28, 2014, 12 pages.
Office Action on U.S. Appl. No. 13/892,026 dated Dec. 8, 2014, 19 pages.
Office Action on U.S. Appl. No. 13/892,057 dated Nov. 28, 2014, 17 pages.
Office Action, U.S. Appl. No. 10/696,507, dated Nov. 13, 2008, 15 pages.
Plastic has replaced glass in photochromic lens, www.plastemart.com, 2003, 1 page.
Press Release, "USAF Awards SBG Labs an SBIR Contract for Wide Field of View HUD", SBG Labs—DigiLens, Apr. 2013, 1 page.
Press Release: "Navy awards SGB Labs a contract for HMDs for simulation and training", Press releases, DigiLens, Oct. 2012, pp. 1-2, retrieved from the internet at http://www.digilens.com/pr10-2012.2.php. 2 pages.
Requirement for Restriction/Election on U.S. Appl. No. 13/844,456 dated Sep. 12, 2014, 23 pages.
Restriction Requirement for U.S. Appl. No. 12/700,557, dated Oct. 17, 2012, 5 pages.
Schechter, et al., "Compact beam expander with linear gratings", Applied Optics, vol. 41, No. 7, Mar. 1, 2002, pp. 1236-1240.
Urey, "Diffractive exit pupil expander for display applications" Applied Optics, vol. 40, Issue 32, pp. 5840-5851 (2001).
Webster's Third New International Dictionary 433 (1986), 3 pages.
Wisely, P.L., Head up and head mounted display performance improvements through advanced techniques in the manipulation of light, Proc. of SPIE vol. 7327, 732706-1, 2009, 10 pages.
Chinese Office Action issued in corresponding application No. 201310557623, dated Jan. 17, 2017, 10 pages.
Extended European Search Report for European Application No. 13765610.4 dated Feb. 16, 2016, 6 pages.
Final Office Action on U.S. Appl. No. 13/250,858, dated Jul. 11, 2016, 21 pages.
Final Office Action on U.S. Appl. No. 13/864,991, dated Jun. 27, 2016, 16 pages.
Final Office Action on U.S. Appl. No. 14/044,676, dated Aug. 12, 2016, 23 pages.
Final Office Action on U.S. Appl. No. 14/152,756, dated Oct. 12, 2016, 18 pages.

(56) References Cited

OTHER PUBLICATIONS

Final Office Action on U.S. Appl. No. 14/168,173, dated Nov. 4, 2015, 10 pages.
Final Office Action on U.S. Appl. No. 14/260,943, dated Jul. 19, 2016, 23 pages.
Non-final Office Action on U.S. Appl. No. 13/250,858, dated Nov. 14, 2016, 18 pages.
Non-final Office Action on U.S. Appl. No. 13/844,456, dated Aug. 16, 2016, 18 pages.
U.S. Appl. No. 14/814,020, filed Jul. 30, 2015, Brown et al.
Non-Final Office Action on U.S. Appl. No. 13/844,456, dated Dec. 29, 2016, 24 pages.
Non-Final Office Action on U.S. Appl. No. 13/844,456, dated Jan. 15, 2016, 16 Pages.
Non-Final Office Action on U.S. Appl. No. 13/864,991 dated Nov. 30, 2015, 18 pages.
Non-Final Office Action on U.S. Appl. No. 13/892,026 dated Mar. 22, 2016, 16 pages.
Non-Final Office Action on U.S. Appl. No. 13/892,057, dated May 16, 2016, 23 pages.
Non-Final Office Action on U.S. Appl. No. 14/044,676, dated Dec. 29, 2016, 26 pages.
Non-Final Office Action on U.S. Appl. No. 14/044,676, dated Jan. 20, 2016, 21 pages.
Non-Final Office Action on U.S. Appl. No. 14/152,756, dated Apr. 26, 2016, 17 pages.
Non-Final Office Action on U.S. Appl. No. 14/168,173 dated Mar. 10, 2016, 9 pages.
Non-Final Office Action on U.S. Appl. No. 14/260,943 dated Feb. 3, 2016, 19 pages.
Non-Final Office Action on U.S. Appl. No. 14/465,763, dated Sep. 29, 2016, 4 pages.
Non-Final Office Action on U.S. Appl. No. 14/497,280, dated Sep. 22, 2016, 15 pages.
Non-Final Office Action on U.S. Appl. No. 14/820,237, dated Aug. 5, 2016, 14 pages.
Non-Final Office Action on U.S. Appl. No. 15/005,507, dated Nov. 22, 2016, 7 pages.
Non-Final Office Action on U.S. Appl. No. 13/250,858, dated Mar. 18, 2016, 20 pages.
Notice of Allowance on U.S. Appl. No. 13/432,662, dated Feb. 18, 2016, 10 pages.
Notice of Allowance on U.S. Appl. No. 13/892,026, dated Jul. 18, 2016, 10 pages.
Notice of Allowance on U.S. Appl. No. 13/892,057, dated Nov. 8, 2016, 10 pages.
Notice of Allowance on U.S. Appl. No. 14/814,020, dated Aug. 12, 2016, 15 pages.
Notice of Allowance on U.S. Appl. No. 14/820,237, dated Jan. 23, 2017, 10 pages.
Notice of Reasons for Rejection for Japanese Application No. 2015-509120, dated Nov. 1, 2016, 4 pages.

\* cited by examiner

SYSTEM FOR AND METHOD OF INTEGRATING HEAD UP DISPLAYS AND HEAD DOWN DISPLAYS

BACKGROUND

Displays are used in various applications. For example, avionic and other vehicular systems use head down display (HDD) systems and head up display (HUD) systems including but not limited to wearable displays, such as, helmet mounted display (HMD) systems. In aircraft applications, HUD and HDD systems advantageously display information from aircraft systems and sensors in a graphical and alphanumeric format. The display information can include an enhanced vision image from a vision system (e.g., camera or other imaging sensor (such as a visible light imaging sensor, infrared imaging sensor, millimeter wave radar imager, or combinations thereof)). The display information can also or alternatively include a synthetic vision image from a synthetic vision system (e.g., computer generated graphics based upon a terrain and structure database).

HUDs generally include combiners disposed above the glare shield and can provide information conformally with the view of the environment through the windshield. Conventional HUDs cannot be used to conformally view information through the glare shield due to the opacity of the glare shield and equipment behind the glare shield. Modern cockpits are incorporating large area head down displays (LADs or LAHDDs) systems. The LADs can provide panoramic views and large areas to display information below the glare shield of the aircraft. However, such LADs do not provide HUD capabilities. Further, disposition of the LADs below the glare shield makes it difficult to provide an image continuous with the pilot's view of the environment.

Accordingly, there is a need for a display system that provides a continuous view of an outside environment despite the presence of a LAD. Further, there is a need to increase the vertical field of view of display systems used in aircraft and other vehicles. Further still, there is a need to integrate images provided on HDDs and HUDs. Yet further, there is a need for a HUD integrated with an LAD or other HDD in a cockpit or control center. Yet further still, there is a need for a compact HUD for use with an LAD. There is further a need for a display system that can provide an extended vertical view. Further still, there is a need for a virtual window image on a HDD that is compatible with a view through a combiner of a HUD. Yet further, there is a need for a vision system image or synthetic vision image that is integrated with the view from a combiner of a HUD.

SUMMARY

In one aspect, the inventive concepts disclosed herein are directed to a method or apparatus that can be used with an aircraft or other vehicle. The apparatus can include or the method can use a waveguide disposed at least partially above a top surface of a glare shield. The waveguide can be part of a head up display (HUD). The waveguide can extend below the glareshield to partially or fully cover the LAD to provide an integrated display.

In another aspect, the inventive concepts described herein are directed to a display system for use in a cockpit and for providing light from an image source. The display system includes a waveguide and a head down display. The waveguide is disposed at least partially above a top surface of a glare shield and has a first coupler at a first end and a second coupler at a second end. The waveguide is positioned as a combiner and allows viewing of an outside scene and information from the image source. The head down display is disposed below the top surface of the glare shield. The waveguide is disposed to cover at least partially the head down display.

In still another aspect, the inventive concepts disclosed herein are directed to a method of providing a first image and a second image to a pilot. The method includes providing the first image on a waveguide combiner disposed at least partially above a top surface of a glare shield, and providing the second image on the waveguide combiner in front of a screen of a head down display below the top surface of the glare shield. The second image includes a vision system image or synthetic vision image continuous with a view of the environment through the first image on the waveguide combiner.

In yet another aspect, the inventive concepts disclosed herein are directed to a head up display. The head up display includes a waveguide combiner including an input grating and an output grating. Light travels from the input grating to the output grating by total internal reflection. The waveguide combiner has a top edge which is disposed above a top surface of the glareshield and a bottom edge which is disposed below a top surface of the glare shield. The head up display is configured to provide an image from the top edge to the bottom edge.

BRIEF DESCRIPTION OF THE DRAWINGS

The disclosure will become more fully understood from the following detailed description, taken in conjunction with the accompanying drawings, wherein like reference numerals denote like components, and.

DETAILED DESCRIPTION OF THE EXEMPLARY EMBODIMENTS

Figure 1:
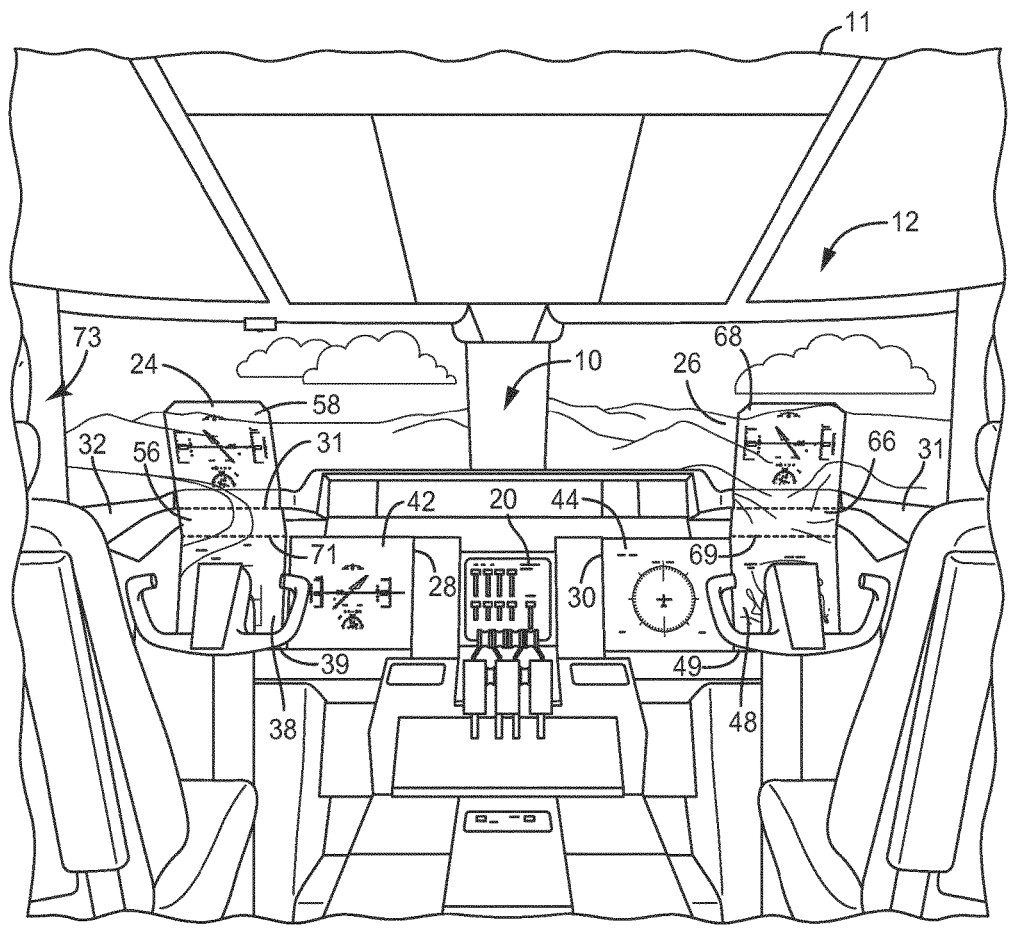
FIG. 1 is a perspective view schematic illustration of an aircraft control center or cockpit including a display system, according to some embodiments.

Before describing in detail the particular improved system and method, it should be observed that the invention includes, but is not limited to, a novel structural combination of conventional data/signal processing and optical components and communications circuits, and not in the particular detailed configurations thereof. Accordingly, the structure, methods, functions, control and arrangement of various components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

According to some exemplary embodiments, a display system provides a virtual window to an environment despite the blocking effects of a head down display (HDD) or other structure. In some embodiments, a head up display (HUD) is overlaid with a HDD to increase vertical field of view. In some embodiments, the HUD and HDD may be integrated into a single unit. The display system allows sensed (from an enhanced vision system (EVS)) and generated (from a synthetic vision system (SVS)) real-world features and/or representative icons to be displayed to the flight crew in conjunction with HUD operations. Advantageously, the system and method of some embodiments extends the conformal view down in front of the flight deck displays or HDDs in the aircraft in front of the pilot.

In some embodiments, the system and method expands the vertical area of a HUD combiner to extend down to or past the upper edge of the large format HDD and overlays the conformal (e.g., collimated) image of the waveguide on top of or instead of an image on the large format display. In some embodiments, the image on the HUD combiner in front of the large format display also displays conformal symbology/images in that area of the flight deck and continues the conformal type image presented on the upper portion of the HUD. In some embodiments, this area becomes a virtual window when linked with EVS or SVS images of real world features as if the pilot was looking directly through the flight deck display panel. Combining this virtual window with the HUD view through the upper portion of the HUD combiner provides seamless visibility and operation over an extended vertical field of view in some embodiments.

In some embodiments, extending the conformal vertical field of view downward advantageously allows the presentation of real world cues to the pilot both for a longer period of time and earlier in certain low visibility conditions in some embodiments. The slant range to ground level using the display system advantageously allows for an EVS sensor to depict real world cues earlier than for the same slant range viewed through the HUD and aircraft windshield in some embodiments.

With reference to FIG. 1, a display system 10 is provided for an aircraft 11 and includes a cockpit or an aircraft control center 12. Although discussed with respect to the aircraft 11, the display system 10 can be utilized in a variety of applications including other transportation applications (e.g. ground vehicle, marine, space, etc.), robotic or drone applications, medical applications, etc. according to some embodiments.

The aircraft control center 12 includes a HDD 20, a combiner 24, a combiner 26, an HDD 28, and an HDD 30. The HDDs 20, 28 and 30 and the combiners 24 and 26 can be used to provide information to the flight crew, thereby increasing visual range and enhancing decision-making abilities. The combiners 24 and 26 are associated with a HUD system and at least one projector for such a system. The HDDs 28 and 30 can be large area format HDDs in some embodiments.

In some embodiments, the HDDs 20, 28 and 30 and the combiners 24 and 26 provide images associated with weather displays, weather radar displays, communication displays, flight data displays, engine instrument information display, chart display, mapping displays, flight plan displays, terrain displays, or other flight instrumentation. Further, the HDDs 20, 28 and 30 and the combiners 24 and 26 include a synthetic vision system (SVS) image, an enhanced vision system (EVS) image (e.g., an EFVS image), a radar image, a sensor image or a merged image derived from any two or more of the SVS image, the radar image, the sensor image, and the EVS image in some embodiments. For example, the HDDs 20, 28 and 30 and the combiners 24 and 26 are configured to display a three dimensional or perspective image of terrain and/or weather information in some embodiments. Other views of terrain and/or weather information can also be provided (e.g., plan view, horizontal view, vertical view, or combinations thereof).

The HDDs 20, 28 and 30 and the combiners 24 and 26 can be implemented using any of a variety of display technologies, including cathode ray tube (CRT), liquid crystal display (LCD), organic LED display, laser-based, and other display technology. The combiners 24 and 26 can be any type of device for providing conformal images, including but not limited to, waveguide combiners, reflective combiners, holographic combiners, etc.

The display system 10 is configured to provide one or more images 38, 42, 44, 48, 56, 58, 66, and 68 in some embodiments. The HDD 28 includes the image 38 and the image 42 in some embodiments. The image 56 on the combiner 24 is provided partially above the image 38 on the HDD 28 on the combiner 24 in some embodiments. The image 58 is provided above the image 56 on the combiner 24 in some embodiments. The images 38, 56, and 58 can be provided as an integrated view. The image 42 is provided on the HDD 28 to the right of the image 38 in some embodiments. The image 38 generally has the same width from left to right as the images 56 and 58 on the combiner 24 in some embodiments. The images 56 and 58 can include flight instrumentation information, compasses, navigation flight and hazard information. The HDD 30 includes the images 44 and 48 similar to the images 38 and 42 provided in conjunction with the images 66, and 68 on the combiner 26.

In some embodiments, the image 56 is provided on the combiner 24 from a top surface 31 of a glare shield 32 through a top edge 71 of the HDD 28 to a bottom edge 39 of the HDD 28 and overlays the image 38. The image 56 extends past the bottom edge 39 in some embodiments. In some embodiments, the combiner 26 similarly overlays the HDD 30 from the top surface 21 through a top edge 69 of the HDD 30 to a bottom edge 49 of the HDD 30. An image 66 on the combiner 26 overlays the image 48 in some embodiments.

The image 58 is an image including flight control symbols and/or other HUD symbology with or without a vision system image or SVS image provided conformally on the combiner 24 in some embodiments. In some embodiments, the image 58 does not include flight control symbols and /or other HUD symbology and includes a vision system image and/or a SVS image. The image 56 includes a vision system image or SVS image provided in a continuous nature with a vision system image or SVS image on the image 58. The image 56 has an area associated with a virtual view through the glare shield 32 and the HDD 28 in some embodiments. In some embodiments, the display system 10 provides the SVS or EVS image as the image 56 and does not provide the image 28.

The HDDs 20, 28 and 30 are provided beneath the top surface 31 of the glare shield 32. The portion of the combiner 24 associated with the image 56 extends from a viewing angle from a pilot's eye location 73 to the top surface 31 of the glare shield 32 to bottom edge 39 of the HDD 28 in some embodiments. Similarly, the image 66 extends from a viewing angle from the co-pilot's eye location to top surface 31 of glare shield to the bottom edge 49 of the HDD 30. In some embodiments, the combiners 24 and 26 can contact, abut against, be adjacent, or be attached to top edges 71 and 69 or the bottom edges 39 and 49, respectively, of the HDDs 28 and 30 in some embodiments. In some embodiments, the top edges 71 and 69 and the bottom edges 39 and 49 include housing structure or other edge material.

In some embodiments, the combiners 24 and 26 are disposed at least partially below the glare shield 32. The combiners 24 and 26 can be disposed through an aperture in the glare shield 32, a recess in the glare shield 32 or in front of the glare shield 32 in some embodiments. The combiners 24 and 26 are configured to provide collimated light images (e.g., the images 56, 58, 66, and 68) from a flight deck eye reference point (e.g., the location 73) to provide an adequate real world field view in some embodiments.

In some embodiments, the HDDs 28 and 30 without images from the combiners 24 and 26 provide an image of the environment associated with the aircraft 11 (e.g., during approach and landing) or taxiway (e.g., while taxiing). In some embodiments, one of the combiner 24 or the combiner 26 displays an extended view of the environment with a virtual window through the glare shield 32 while the other does not. In some embodiments, the combiners 24 and 26 display the extended view of the environment across at least part of the viewing screen of the HDDs 28 and 30, respectively. The extended view of the environment is derived from EVS data, radar data, and SVS data in some embodiments. In some embodiments, the images 38 and 48 have a black or dark background when the images 56 and 66 are provided. In some embodiments, although the images 56 and 58 are described as separate images, the images 56 and 58 are a single integrated image in some embodiments. The images 56 and 58 can be provided by the same electronic and optical hardware in some embodiments. The images 66 and 68 are a single integrated image in some embodiments. The images 56 and 66 and have a clear background when the images 38 and 48 are provided on the HDDs 28 and 30 in some embodiments.

Figure 2:
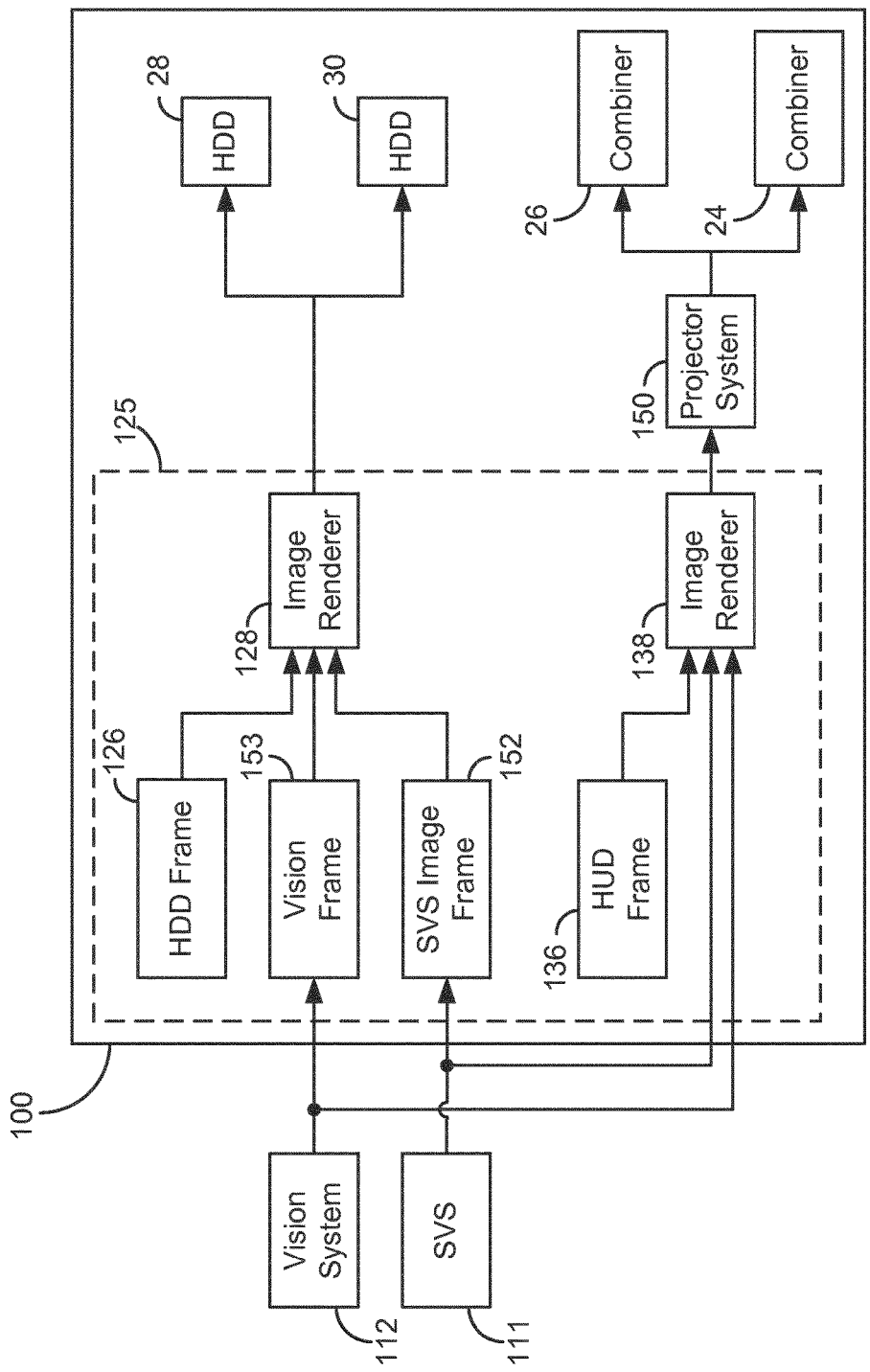
FIG. 2 is a schematic general block diagram of a display system for displaying images that can be used as the display system in the aircraft control center of FIG. 1 according to some embodiments.

Referring to FIG. 2 a display system 100 can be utilized as the display system 10 in FIG. 1 for providing an image to any of the HDDs 28 and 30 and the combiners 24 and 26. The display system 100 includes a processor 125 including an HDD frame module 126, an image renderer 128, a HUD frame module 136, and an image renderer 138 in some embodiments. Processor 125 is coupled to a projector system 150 for the combiners 24 and 26 and is coupled to the HDDs 28 and 30 in some embodiments. In some embodiments, the display system 100 includes a memory 152 for storing a synthetic vision frame from a synthetic vision system (SVS) 111 and a memory 153 for storing a vision frame from a vision system (VS) 112. The processor 125 serves to provide a conformal image extended over the field of view through the combiner 24 or through the combiner 26 in some embodiments.

The display system 100 is in communication the VS 112 (e.g., an enhanced vision system) and the SVS 111. The SVS 111 is optional in some embodiments. The VS 112 is optional in some embodiments. In some embodiments, the VS 112 is an enhanced vision system manufactured by Rockwell Collins (e.g., an EVS 3000 system) or a suitable alternative. In some embodiments, the SVS 111 is a synthetic vision system manufactured by Rockwell Collins (e.g., a Pro Line 21 system) or a suitable alternative.

According to some embodiments, the SVS 111 can be any electronic system or device for providing a computer generated image of the external scene topography. The image can be from the perspective of the aircraft flight deck as derived from aircraft attitude, high-precision navigation solutions, and a database of terrain, obstacles and relevant cultural features. According to one embodiment, the VS 112 can be any electronic system or device for providing a sensed image of the external scene topography. The VS 112 can be an infrared or visual camera in one embodiment.

The image renderer 128 utilizes display information from the HDD frame module 126 and the SVS 111 and the VS 112 to provide an image on the HDDs 28 and 30. The image renderer 128 can be utilized to provide any type of flight information. In some embodiments, the image renderer 128 provides a SVS or EVS image as the image 38 on the HDD 28 and flight information as image 42 on the HDD 28. Similar images can be provided on the display 30 in some embodiments. The image renderer 128 uses video frame data stored in one or both of the memories 152 and 153 to provide the images 38 and 48 (FIG. 1) in some embodiments or can use such data from the SVS 111 or VS 112.

The HUD frame module 136 provides information (e.g., HUD symbology) to the image renderer 138 for providing the images 56, and 58 on the combiner 24 and/or the images 66, and 68 on the combiner 26. The image renderer 138 uses data from the SVS 111 or VS 112 or data from the memories 152 or 153 to provide images 56 and 58. The HUD frame module 136 can also provide other flight information. In some embodiments, the HUD symbology is provided in the image 58 (FIG. 1) without the SVS or VS image.

The modules 126 and 136 and the renderers 128 and 138 can be hardware components (e.g., a processor) or hardware components executing software configured to provide the extended field of view and other images in some embodiments. The memories 152 and 153 are frame memories or other storage devices in some embodiments.

The processor 125 can be part of or integrated with a radar system, the SVS 111, the VS 112, a HDD display computer for the HDDs 20, 28, and 30, or a HUD computer for the projector system 150 in some embodiments. In some embodiments, the processor 125 is an independent platform. In some embodiments, the processor 125 is integrated with a camera for VS 112.

The display system 100 can also include a data link receiver or data bus for receiving information from one or more of flight management computers and other avionic equipment for receiving phase of flight indications. Phase of flight indications can be used to automatically choose an extended field of view format at landing, approach, or take off In some embodiments, the systems and methods can be utilized have an extended field of view on one of the combiners 24 and 26 and associated the HDDS 28 and 30 and other information on the other of the combiners 24 and 26. For example, during landing a pilot can view the extended view including synthetic vison or enhanced vision information in the image 56 (FIG. 1) on the combiner 24 while the co-pilot views HUD symbology in the image 68 on the combiner 26 and other non-synthetic vision or enhanced vison information as the image 66, and image 48 on the combiner 26 and HDD 30. In some embodiments, the display system 10 advantageously uses the images 56 and 66 to provide non-synthetic vision or enhanced vison information.

The HDDs 20, 28 and 30 can be any type of displays including cathode ray tubes, liquid crystal display (LCD) panels, organic light emitting diodes (OLED) panels, or other display types. Projector system 150 can be any projection system for providing images to combiners 24 and 26. The projector system 150 can provide collimated light to the combiners 24 and 26 in some embodiments. The combiners 24 and 26 can be any type of combiner including but not limited to: wave guide combiners, holographic combiners, half-silvered mirrors, reflective combiners, etc. In some embodiments, the projection system 150 and the combiners 24 and 26 are based on optical waveguide technology using a flat piece of glass or plastic as the combiner waveguide. The combiners 24 and 26 include diffraction gratings or other couplers to bend light from an LED illuminated micro display in the projection system 150 in some embodiments. Although shown in FIG. 1 as combiners that are mounted within glare shield 32, overhead mounted HUDs or combiners can also be utilized.

Figure 3:
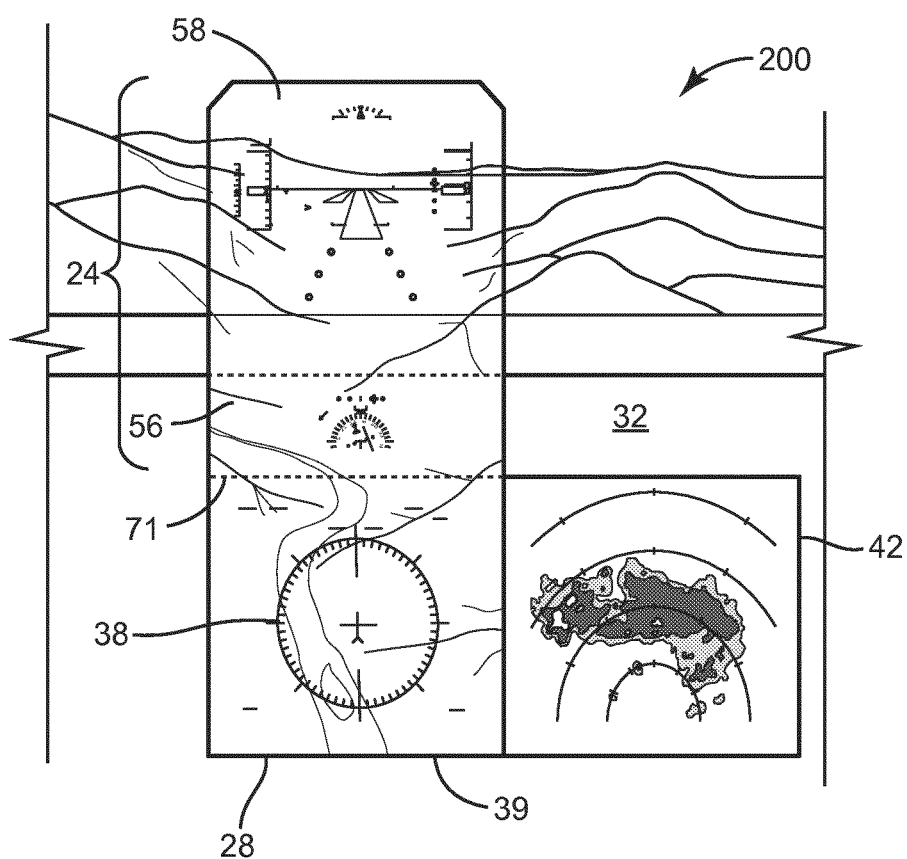
FIG. 3 is a more detailed, partial, front planar view of the display system illustrated in FIG. 1 showing more detailed images that are provided by the display system according to some embodiments.

With reference to FIG. 3, an environment 200 is viewable through a portion of the combiner 24 associated with the image 58 in some embodiments. A portion of the combiner 24 associated with the image 56 shows environment 200 generated from SVS or EVS data as well as flight data in some embodiment. The image 38 from the HDD 28 is viewable with the image 56 on the combiner 24 in some embodiments. A pilot cannot view the environment 200 in the real world through portion of the combiner 24 associated with the image 56 due to the presence of the glare shield 32 and the HDD 28. The image 56 on the combiner 24 includes an SVS image or EVS image in some embodiments. The SVS image or EVS image is provided from the top surface 31 to the bottom edge 39 of the HDD 28 to provide an integrated, and more extended vertical field of view in some embodiments.

Figure 4A:
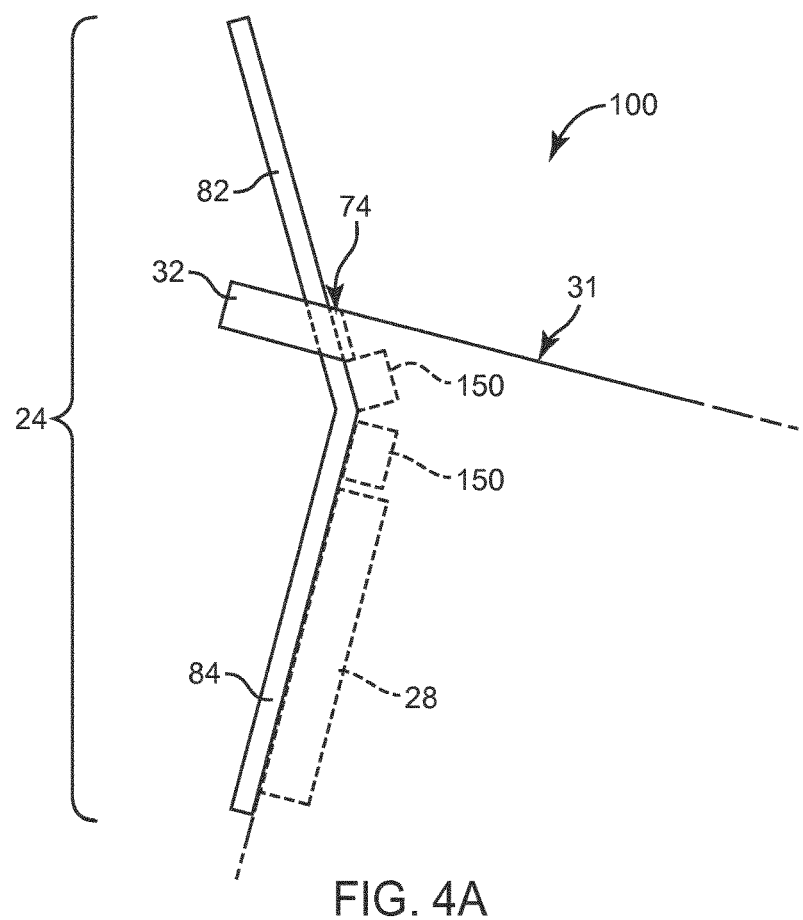
FIG. 4A is a simplified side view of a combiner for the display system illustrated in FIG. 3 according to some embodiments.
Figure 4B:
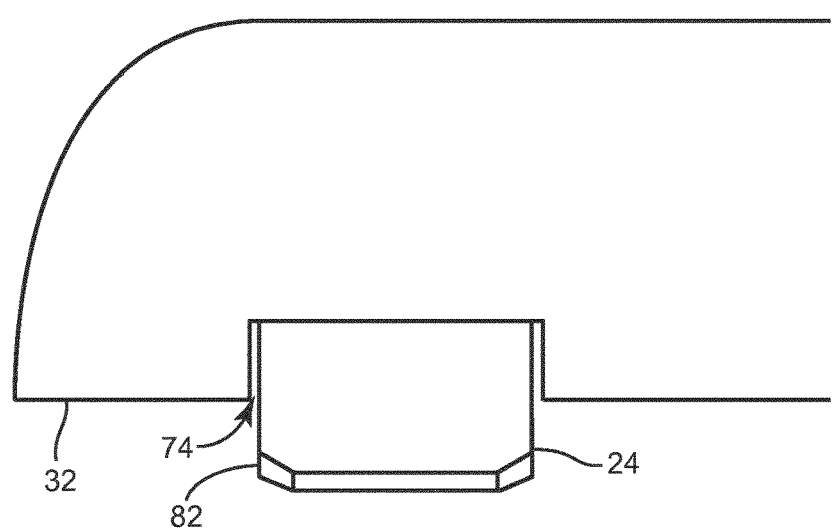
FIG. 4B is a simplified top view of a combiner for the display system illustrated in FIG. 3 according to some embodiments.

With reference to FIGS. 4A-4B, glare shield 32 includes a recess 74 for receiving the combiner 24. The projector system 150 (FIG. 2) can be disposed below the top surface 31 of the glare shield 32 in some embodiments. Light from the projection system 150 can be injected into the combiner 24 beneath the glare shield 32 in some embodiments.

The combiner 24 can be manufactured from thin plastic or glass (e.g., ¼ inch) plate to reduce the size of the recess 74 in some embodiments. In some embodiments, the combiner 24 is a two piece combiner having an upper combiner plate 82 and a lower combiner plate 84. Light is injected into a top end of the lower combiner plate 84 and a bottom end of the top combiner plate 82 from the projector system 150 (e.g., one projector system 150 for each of plates 82 and 84 in FIG. 4A) in some embodiments. In some embodiments, light is injected in respective edges of the combiner plates 82 and 84. The combiner plates 82 and 84 are not co-planar in some embodiments. In some embodiments, the bottom combiner plate 84 is co-planar with the screen of the HDD 28 and the top combiner plate 82 is angled with respect to the bottom combiner plate 84. In some embodiments, the top combiner plate 82 is angled toward the pilot. The combiner 26 can have a similar structure to the combiner 24.

Figure 5:
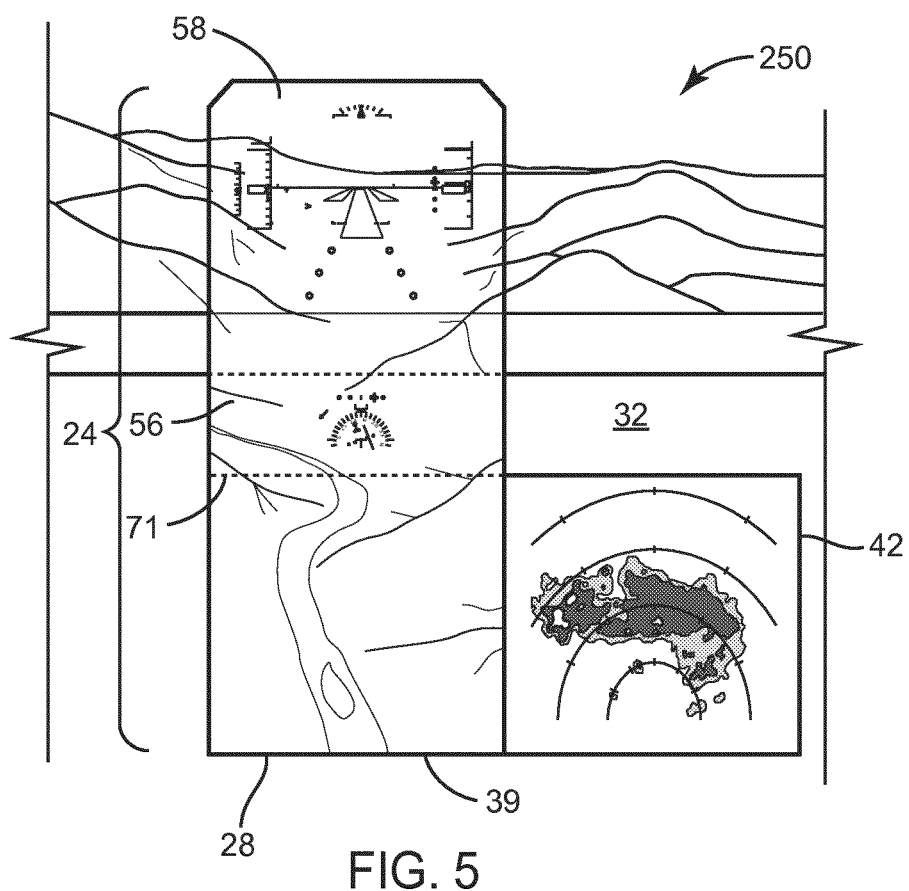
FIG. 5 is a more detailed partial front planar view of the display system illustrated in FIG. 1, showing more detailed images as are provided on the display system according to some embodiments.

With reference to FIG. 5, an environment 250 is viewable through a portion of the combiner 24 associated with the image 58 in some embodiments. A portion of the combiner 24 associated with the image 56 shows the environment 250 generated from SVS or EVS data as well as flight data in some embodiments. An image is not provided on HDD 28 when image 56 is provided in some embodiments.

Figure 6:
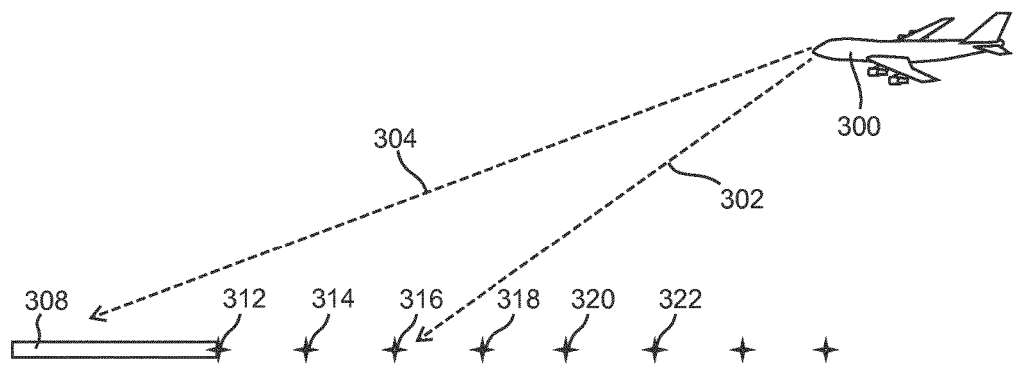
FIG. 6 is an illustration showing an aircraft using the display system illustrated in FIG. 1 to obtain an increased vertical field of view on approach to a runway according to a some embodiments.

With reference to FIG. 6, an aircraft 300 on approach can view a runway 308 at a sight line 304 through the combiner 24 (FIG. 1). With the sight line 304, the pilot cannot view runway infrastructure such as runway lights 312, 314, 316, 318 and 320 in some embodiments. However, using the virtual window associated with the image the pilot is able to view more of runway infrastructure, such as, the runway lights 312, 314 and 316, along a sight line 302 in some embodiments. In some embodiments, the sight line 304 provides a vertical viewing angle of negative 15 degrees and the sight line 302 using the real world view through combiner 24, provides a viewing angle of negative 35 degrees using the images 38 and 56 continuous with the real world view through the combiner 24.

Figure 7:
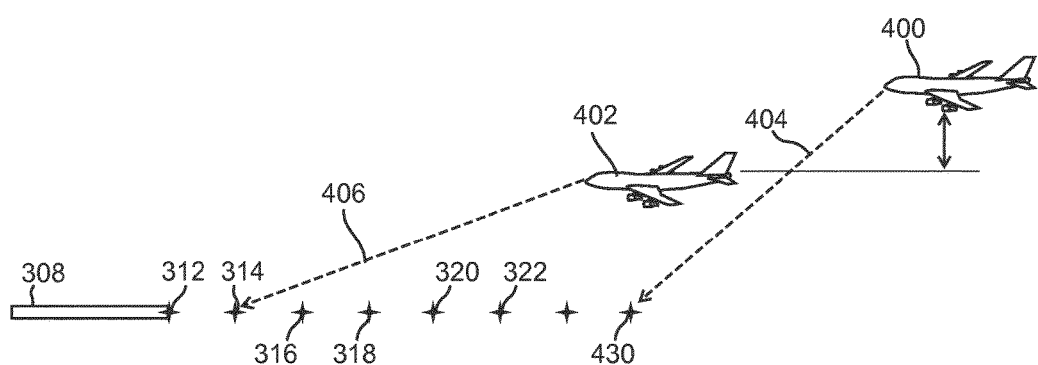
FIG. 7 is an illustration of an aircraft using the display system illustrated in FIG. 1 showing the increase in detection altitude associated with using the increased vertical field of view achieved by using the display system according to some embodiments.

With reference to FIG. 7, an aircraft 400 has a sight line 404 using display system 10 (FIG. 1) with an extended vertical view. On approach, an aircraft 402 does not include an extended field view and is not able to see the runway lights 316 and 318 on a sight line 406 associated with the runway 308 while the aircraft 400 views the runway light 340 on a sight line 404. According to some embodiments, the aircraft 402 has a vertical field view of that extends to negative 15 degrees, and the aircraft 404 has a vertical field view of extending to negative 35 degrees using the display system 10.

The display system 100 can advantageously increase the decision altitude for the aircraft 400. For example, if the aircraft 400 is at a detection altitude of 200 feet, the slant range of its EVS sensor is approximately 773 feet. That same slant range can detect the runway light 340 at a detection altitude of 443 feet for the aircraft 400 due to the increased vertical field view. The detection altitude (DA) is calculated using $$DA = SR * \sin \theta_{VFOV}$$

where DA is detection altitude, SR is slant range and $\theta_{OVFOV}$ is the vertical field of view. Accordingly, for a constantly continuous environmental visibility obscurant, the VS 112 (FIG. 2) has the potential to detect approach lights 243 feet in altitude higher (and hence earlier on approach) than a conventional system. The ability to view real world queues along the aircraft flight path (e.g., the runway 308 and the runway lights 312, 314, 316, 318, 320 and 322 or other infrastructure) from a wide range is advantageous and particularly advantageous for rotary wing applications due to the type of flight maneuvers performed by rotary wing aircraft.

The wider range is achievable using the virtual window operations described herein. The virtual window operation or extended field of view operation can be automatically engaged based upon phase of flight or by the manual selection controlled by the pilot.

While the detailed drawings, specific examples, detailed algorithms, and particular configurations given describe preferred and exemplary embodiments, they serve the purpose of illustration only. The inventive concepts disclosed herein are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the image and processing devices. For example, the type of system components and their interconnections may differ. The systems and methods depicted and described are not limited to the precise details and conditions disclosed. The flow charts show exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. A display system comprising:
  a waveguide disposed at least partially above a top surface of a glare shield, the waveguide being configured as a combiner to allow viewing of an outside scene and first information from an image source, wherein the waveguide comprises at least a first portion of a first surface for viewing the outside scene and the first information by a user, wherein the waveguide is configured to be disposed such that the first surface is between the user and a windshield; and
  a head down display disposed below the top surface of the glare shield, wherein the first surface of the waveguide comprises a bottom edge, the bottom edge extending below the top surface of the glare shield and wherein at least a second portion of the first surface is between a second surface of the head down display and the user, wherein the second surface is for providing second information from the head down display to the user, wherein the first surface of the waveguide is a continuous viewing surface between a top edge of the waveguide and the bottom edge of the waveguide, wherein the top edge of the waveguide is in front of a portion of the windshield through which the outside scene is viewable, and a top of the continuous viewing surface is in front of the portion of the windshield through which the outside scene is viewable and a bottom of the continuous viewing surface is in front of or below the head down display.

2. The display system of claim 1, wherein the second portion of the first surface completely covers the second surface.

3. The display system of claim 2, wherein the first surface is planar.

4. The display system of claim 1, further comprising:
  processing electronics configured to provide the first information comprising first image data and second image data to the waveguide, wherein the first image data is conformal image data for viewing through the windshield and the second image data is virtual image data referenced to eye positon.

5. The display system of claim 4, wherein a virtual image associated with the virtual image data is continuous across the continuous viewing surface of the waveguide and is provided in the first portion of the first surface of the waveguide and the second portion of the first surface of the waveguide.

6. The display system of claim 5, wherein the head down display is a large area display and wherein a head down display image of the head down display has a width matching the width of the waveguide.

7. The display system of claim 6, wherein the waveguide comprises a first plate and a second plate, the first plate and the second being angled with respect to one another, wherein the first surface is disposed on the first plate and the second plate.

8. The display system of claim 7, wherein the second image data is provided in response to phase of flight.

9. The display system of claim 1, wherein the waveguide comprises a first plate and a second plate, the first plate and the second being angled with respect to one another, the second plate comprising at least the portion of the first surface, the first surface being parallel with the second surface of the head down display, the first plate and the second plate including diffraction gratings for injecting and ejecting light from the image source.

10. A head up display, comprising:
  a waveguide combiner comprising a top edge and a bottom edge, wherein the waveguide combiner is configured to be disposed above and below a top surface of a glare shield, the glare shield having a bottom surface, wherein the waveguide combiner is configured to provide an image on a first portion of a first surface between the top edge and the bottom edge, wherein the first surface is a continuous viewing surface from a top of the first surface to a bottom of the first surface, wherein the top is in front of a portion of a windshield through which an environment is viewable, wherein the first surface is between a user and the windshield and extends below the glare shield and the first surface is disposed in front of at least an edge of a portion of the glare shield between the top surface of the glare shield and the bottom surface of the glare shield, wherein a top of the continuous viewing surface is in front of the portion of the windshield through which the environment is viewable and is disposed in front of the portion of the glare shield between the top surface of the glare shield and the bottom surface of the glare shield.

11. The head up display of claim 10, wherein the bottom edge of the waveguide combiner is disposed adjacent a bottom edge of a head down display.

12. The head up display of claim 11, wherein the waveguide combiner provides a synthetic vision image or an enhanced vision image.

13. The head up display of claim 12, further comprising:
  processing electronics configured to provide a second image on the head down display continuous with the synthetic vision image or the enhanced vision image.

14. A head up display, comprising:
  a waveguide disposed at least partially above a top surface of a glare shield, the waveguide being configured as a combiner to allow viewing of an outside scene and first information from an image source, wherein the waveguide comprises at least a first portion of a first surface for viewing the outside scene and the first information by a user, wherein the waveguide is configured to be disposed such that the first surface is between the user and a windshield;
  a head down display below the top surface of the glare shield, wherein the first surface of the waveguide comprises a bottom edge, the bottom edge extending below the top surface of the glare shield and wherein at least a second portion of the first surface is between a second surface of the head down display and the user, wherein the second surface is for providing second information from the head down display to the user, wherein the first surface of the waveguide is a continuous viewing surface between a top edge of the waveguide and the bottom edge of the waveguide, wherein the top edge of the waveguide is in front of a portion of the windshield through which the outside scene is viewable, and a top of the continuous viewing surface is in front of the portion of the windshield through which the outside scene is viewable and a bottom of the continuous viewing surface is in front of or below the head down display; and a projector configured to provide a first image on the waveguide and a second image on the waveguide and in front of a screen of the head down display, the second image comprises a vision image or synthetic vision image continuous with a view of an environment through the head down display.

15. The head up display of claim 14, wherein the first image comprises another enhanced vision image or another synthetic vision image conformally mapped with the view of the environment through the waveguide.

16. The head up display of claim 14, wherein the first image comprises flight symbols conformally mapped with the view of the environment through the waveguide.

17. The head up display of claim 14, wherein the waveguide has a bottom edge extending to or past a bottom edge of the head down display.

18. The head up display of claim 14, wherein the bottom edge of the waveguide is at least partially below the glare shield.

19. The head up display of claim 14, wherein the head down display comprises a large area display.

20. The head up display of claim 14, wherein the head down display provides a third image and the second image is provided in response to phase of flight.

* * * * *